J. M. ROBERTS.
VEHICLE JACK.
APPLICATION FILED JULY 28, 1919.
1,335,858.
Patented Apr. 6, 1920.
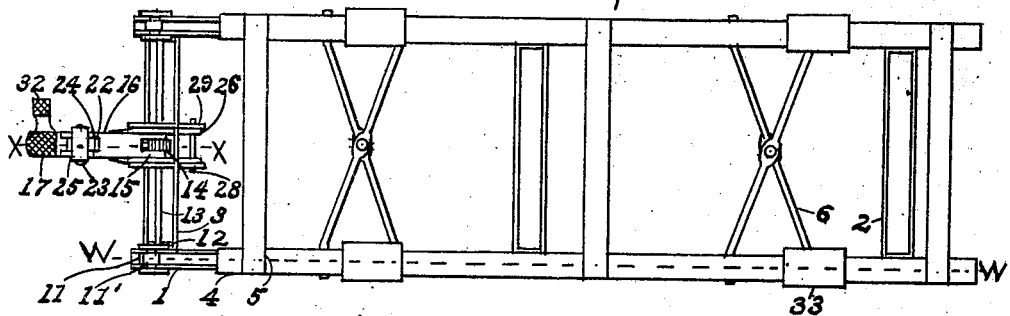
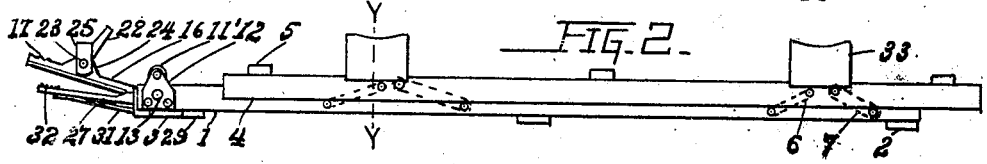
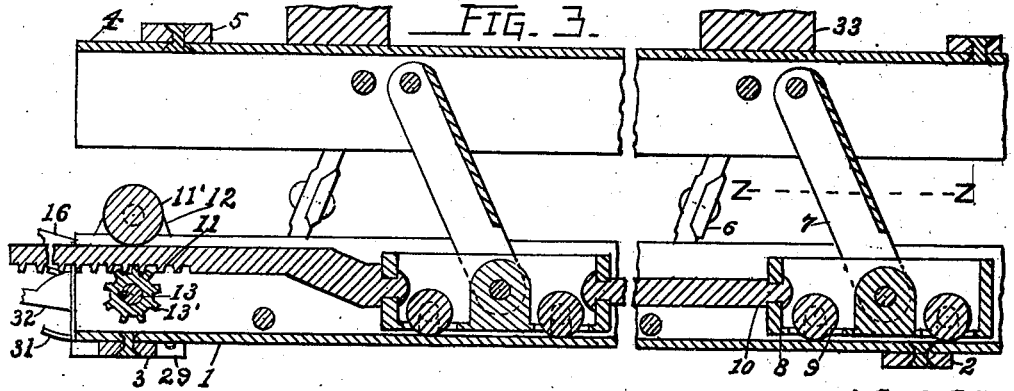
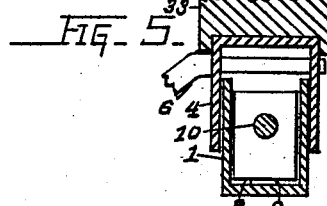
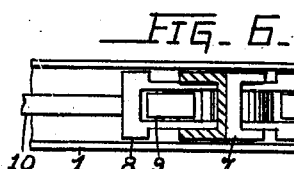
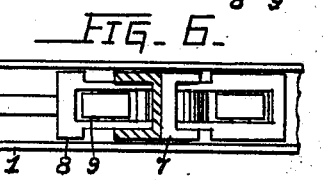
INVENTOR.
James M. Roberts
BY George W. Hinton
ATTORNEY.

UNITED STATES PATENT OFFICE.

JAMES M. ROBERTS, OF NEAR ST. JOSEPH, MISSOURI.

VEHICLE-JACK.

1,335,858.　　　　Specification of Letters Patent.　　Patented Apr. 6, 1920.

Application filed July 28, 1919. Serial No. 313,959.

*To all whom it may concern:*

Be it known that I, JAMES M. ROBERTS, a citizen of the United States, residing near St. Joseph, in the county of Andrew and State of Missouri, have invented certain new and useful Improvements in Vehicle-Jacks, of which the following is a specification, reference being had therein to the accompanying drawing.

My invention relates to improvements in vehicle jacks, for lifting vehicles such as automobiles, trucks and the like, and the objects of my improvements are, first; to provide a simple, substantial and durable jack of this class, which can be operated by using only the feet of a person, in both raising and lowering a vehicle, second; to so construct and arrange the parts of a vehicle jack that when it is lowered, it shall occupy the minimum amount of space, and be of such weight that an ordinary person can move it into position for storing, third; to provide a vehicle jack which shall be comparatively cheap in cost of manufacture and be neat in appearance.

I attain these objects by the mechanism illustrated in the accompanying drawings, in which:

Figure 1 is a top view, showing the jack in its lowered position. Fig. 2 is a side view of the parts seen in Fig. 1. Fig. 3 is an enlarged vertical section in detail of one of the lifting mechanisms, on the line W W, seen in Fig. 1, showing the jack in its raised position, certain parts being broken away. Fig. 4 is a similar section of the pedal mechanism, on the line X X, seen in Fig. 1. Fig. 5 is an enlarged transverse section of one of the two sets of rails, on the line Y Y, seen in Fig. 2, showing the parts in their lowered position. Fig. 6 is an enlarged horizontal section, in detail, of one of the lifting bars, on the line Z Z, seen in Fig. 3, looking downward.

Referring to Figs. 1 and 2, the bottom frame is formed of the two U shaped rails 1 connected by the transverse tie bars 2 and the tie bar 3. The upper frame is formed of the two inverted and slightly wider U shaped rails 4, which are connected by the transverse tie bars 5. Said bottom and upper rails are connected by the two X shaped braces 6, the lower ends of which are oscillatably mounted in said bottom rails while their upper ends are similarly connected with said upper rails. Said braces are thus connected in an inclined position and act both as braces for preventing lateral movement of said upper rails and as members of four sets of lazy tongs. The other members of said lazy tongs are formed of the four bars 7, two of which are indicated by dotted lines in Fig. 2. The upper ends of said bars are oscillatably mounted in the upper rails 4, while their lower ends are similarly mounted on their respective bar carriers 8, as seen in Fig. 3.

Said carriers are provided with wheels 9, which are moved along the upper surfaces of the rails 1, for providing anti-friction supports for said carriers.

Since all four of said carriers are alike in construction and operation, the previous description of one is deemed sufficient.

Said carriers are connected in pairs (see Fig. 3,) by the rods 10, one pair being in each one of the rails 1, of which but one is shown.

Rack 11 is connected with one of said bar carriers, and is held in engagement with pinion 13', by wheel 11', which is rotatably mounted in bearings 12, which are secured on rails 1.

Said pinion is one of a pair of pinions, one of which is secured on each end of the shaft 13.

Ratchet wheel 14 is secured on the central portion of shaft 13.

Bifurcations 15 (see Fig. 4,) of the pawl carrier 16 are oscillatably mounted on the shaft 13, at either side of said ratchet wheel.

The operating pedal 17 is formed on the free end of said pawl carrier. The operating pawl 18 is slidably mounted in said pawl carrier with the rack 19 formed on the stem portion thereof. Said pawl is moved into engagement with the teeth of the ratchet wheel 14, by action of the spring 20, which is mounted in the free end portion of said pawl carrier, between the end of the latter and the extremity of the stem of pawl 18.

The segment of gear teeth 21 is formed on the lower end of the pawl releasing lever 22, which latter is oscillatably mounted on the lever pivot 23, the end portions of which are loosely passed through the bearings 24 and are secured in the lower ends of the inverted U shaped toe clip 25, by which said pawl carrier and the therewith connected parts are lifted.

The teeth of the gear segment 21 are in engagement with the rack 19.

The bifurcations 26 of the pawl lever 27 are oscillatably mounted on the rod 28, the ends of which are secured in the brackets 29, which are formed with the tie bar 3. Said bifurcations extend from said rod, at either side of ratchet wheel 14 and outside of the bifurcations 15.

The holding pawl 30 is formed on the inner end of pawl lever 27, at its juncture with its bifurcations 26, for normally holding said ratchet wheel against clockwise rotation. The outer end of spring 31 is secured on the under surface of the free end portion of pawl lever 27. The free end of said spring presses upon the upper surface of the bottom portion of tie bar 3, for normally holding pawl 30 against the teeth of said ratchet wheel.

The releasing pedal 32 is formed on the free end of the pawl lever 27 and extends therefrom at a right angle thereto, as seen in Fig. 1.

The bottoms of the preferably wooden blocks 33 are channeled to neatly fit on the upper rails 4, and are placed thereon at any desired point. Said blocks are made of such height as will almost reach from said upper rails to the lower surfaces of the axles of the vehicle which is to be raised by the described jack.

In cases where the axles of vehicles vary widely in height from the ground, two sets of said blocks are used, one for the lower and one for the higher axles.

In operation, with the parts of the jack in the position seen in Figs. 1 and 2, the blocks 33 are removed from the rails 4, and the vehicle to be jacked up is preferably driven from the left or pedaled end of the jack into such position that its rear end is approximately over the ratchet wheel 14, with its wheels astride said jack. Said blocks are then placed on the upper rails, under the end portions of the axles of said vehicle, after which the operator of the jack places his right foot upon the pedal 17, with the toe portion of said foot beneath the toe clip 25 and thereby raises said pedal and the therewith connected parts.

He then depresses said pedal, which by the pawl 15, rotates the ratchet wheel 14 counter-clockwise, which similarly rotates the shaft 13 and the pinions 13'. This rotation of said pinions moves the racks 11 and their connected parts, including the lower ends of the bars 7 toward the left, thereby slightly lifting the upper rails 4, the blocks 33 and the thereon supported vehicle.

This pedal operation is rapidly repeated until the thus moved parts are lifted from the position seen in Fig. 1, to the position seen in Fig. 3, with the vehicle lifted clear of the ground.

When it is desired to quickly lower said vehicle, the operator of the jack stands on his left foot, with the toe portion thereof extended over pedal 32, and places his right foot upon pedal 17. While in this position, with the toe portion of his right foot he presses against the releasing lever 22, which by its connected parts moves pawl 18 from its engagement with the teeth of the ratchet wheel 14. At this juncture he presses the toe portion of his left foot upon the pedal 32, overcoming spring 31 and moving the holding pawl 30 from its engagement with the teeth of said ratchet wheel, thereby releasing said wheel and the therewith connected parts. After this said vehicle and the parts supporting the same gravitate, thereby moving the parts from the position seen in Fig. 3, to the position seen in Fig. 1, with the tires of said vehicle resting upon the ground, with the lower edges of the upper rails overlapping the upper edges of the bottom rails 1, as seen in Fig. 5.

Where said vehicle is provided with practically non-resilient tires, and it is desired to lower it slowly, the same is done in the following manner.

The operator with his feet in the previously described positions, rests his weight upon his right foot, thereby holding pedal 17 against upward movement, which by its pawl 15 holds the ratchet wheel 14 against clockwise rotation. At this juncture said operator presses the toe portion of his left foot upon pedal 32 and holds it in this position, thereby releasing said ratchet wheel, as previously described.

The thus released ratchet wheel is rotated clockwise by the gravity of said vehicle and its supporting parts, which rotation is retarded by the pressure of said operator's right foot upon the pedal 17, until said pedal has thereby been raised to the limit of its upward movement. At this juncture said operator releases pedal 32, for holding said ratchet wheel against rotation, as previously described. While said wheel is thus held, said operator with the toe portion of his right foot presses the release lever 22, thereby releasing the pedal 17 from its pawl engagement with the ratchet wheel 14, upon which said pedal is permitted to gravitate to the limit of its downward movement; the speed of said gravitation being controlled by the use of the toe clip 25.

These lowering operations are repeated until the tires of the vehicle are thereby slowly lowered onto the ground.

The operator then depresses pedal 17, as previously described, after which he removes the blocks 33 from rails 4 and stores them, removes the described jack from the place where it was used, and stands it upon end against a wall or other object, where it occupies the minimum amount of space.

Having fully described my invention, what I claim as new and desire to secure by Letters Patent is:

1. In a vehicle jack; the combination with a lower frame composed of a pair of U shaped rails and tie bars connecting them and with an upper frame similarly formed of inverted U shaped rails and tie bars; of two braces crossed upon each other and rigidly secured together at their said crossing, the lower ends of said braces being pivotally mounted in the rails of said lower frame near one end thereof, the upper ends of said braces being similarly mounted in the rails of said upper frame, forming braces which act as toggle members and as bracing means whereby said frames are braced against lateral movement in their relation to each other; a toggle member for each one of said braces, the upper ends of said toggle members being pivotally connected with the rails of said upper frame; another set of similarly constructed braces and toggle members for the other end portions of said frames; and toggle member moving means whereby the lower ends of all said toggle members are moved in the rails of said lower frame thereby raising said upper frame.

2. A lower frame composed of two U shaped rails and tie bars connecting them; an upper frame similarly constructed of inverted U shaped rails and tie bars; a plurality of sets of lazy tongs whereby the four corner portions of said frames are respectively connected; a pair of blocks loosely mounted on each one of said upper rails said blocks being adapted to support the end portions of the axles of a vehicle and thereby support said vehicle; a carrier pivotally connected with the lower end of one of the members of each one of said sets of lazy tongs; wheels for said carriers whereon they are moved along the upper surface of the bottom portions of the rails of said lower frame; connecting means whereby said carriers are connected in pairs one pair in each one of the rails of said lower frame; a rack connected with each one of said pairs of carriers; a rotatably mounted pinion shaft; a pinion secured on each end of said shaft said pinions being respectively engaged with said racks; and pedal operated rotating means whereby said pinions are rotated in one direction for raising the rails of said upper frame and the thereon carried blocks.

3. In a vehicle jack; a rotatably mounted shaft for lifting the upper parts of said jack with a vehicle thereon by manual rotation in one direction of said shaft, said shaft being adapted to be rotated in the opposite direction by gravitation of the lifted parts of said jack and the thereon lifted vehicle; a ratchet wheel secured on the central portion of said shaft; an operating pedal oscillatably mounted on said shaft; a pawl slidably mounted in the body portion of said pedal; a spring whereby said pawl is yieldably held in engagement with the teeth of said ratchet wheel; a gear rack formed on the stem portion of said pawl; a disengaging lever oscillatably mounted on said body portion of said pedal; a segment of gear formed on the lower end of said lever the teeth of said gear being in engagement with the teeth of said rack, said lever being adapted to be oscillated in one direction by the toe portion of the foot of a person for disengaging said engagement of said pawl; a toe clip oscillatably mounted on said body portion of said pedal adjacent to said lever whereby said pedal is lifted; an oscillatably mounted holding pawl pedal; a holding pawl formed with said pedal; and a spring whereby said pedal is yieldably held in its raised position thereby yieldably holding said holding pawl in engagement with the teeth of said ratchet wheel.

4. A vehicle jack comprising a bottom frame; an upper frame adapted to lift a vehicle thereon; pedal operated raising means whereby said upper frame and a vehicle supported thereon are raised, said upper frame being adapted to be lowered by gravitation thereof; and pedal operated controlling means whereby the speed of said gravitation is controlled.

5. In a vehicle jack, a bottom frame composed of two longitudinally disposed U shaped rails connected by transverse tie bars; an upper frame similarly constructed with inverted U shaped rails of greater width than the first mentioned rails; and raising means in said rails whereby said upper frame is raised, said upper frame being adapted to gravitate to normal position with the lower edge portions of its rails overlapping the upper edges of the rails of said bottom frame.

In testimony whereof I affix my signature.

JAMES M. ROBERTS.